US012133278B2

(12) United States Patent
Cao

(10) Patent No.: US 12,133,278 B2
(45) Date of Patent: Oct. 29, 2024

(54) USER EQUIPMENT IN WIRELESS COMMUNICATION SYSTEM, ELECTRONIC APPARATUS, METHOD, AND STORAGE MEDIUM

(71) Applicant: Sony Group Corporation, Tokyo (JP)

(72) Inventor: Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 307 days.

(21) Appl. No.: 17/626,127

(22) PCT Filed: Aug. 7, 2020

(86) PCT No.: PCT/CN2020/107690
§ 371 (c)(1),
(2) Date: Jan. 11, 2022

(87) PCT Pub. No.: WO2021/027705
PCT Pub. Date: Feb. 18, 2021

(65) Prior Publication Data

US 2022/0287131 A1 Sep. 8, 2022

(30) Foreign Application Priority Data

Aug. 15, 2019 (CN) ........................ 201910753424.8

(51) Int. Cl.
*H04W 24/04* (2009.01)
*H04W 76/19* (2018.01)

(52) U.S. Cl.
CPC ........... *H04W 76/19* (2018.02); *H04W 24/04* (2013.01)

(58) Field of Classification Search
CPC ..... H04W 76/19; H04W 24/04; H04W 24/08; H04W 16/28; H04W 28/06; H04B 7/0608; H04B 7/0695; H04B 7/088
See application file for complete search history.

(56) References Cited

U.S. PATENT DOCUMENTS

2020/0137821 A1* 4/2020 Cirik ..................... H04W 76/19
2021/0028849 A1* 1/2021 Chin .................. H04B 7/06964
(Continued)

FOREIGN PATENT DOCUMENTS

CN 107769826 A 3/2018
CN 109429261 A 3/2019
(Continued)

OTHER PUBLICATIONS

International Search Report and Written Opinion mailed on Nov. 10, 2020, received for PCT Application PCT/CN2020/107690, Filed on Aug. 7, 2020, 10 pages including English Translation.
(Continued)

*Primary Examiner* — Edan Orgad
*Assistant Examiner* — Malick A Sohrab
(74) *Attorney, Agent, or Firm* — XSENSUS LLP

(57) ABSTRACT

Disclosed are a user equipment unit in a wireless communication system, an electronic apparatus, a method, and a storage medium. The user equipment unit in a wireless communication system communicates with an electronic apparatus in the wireless communication system by means of a primary cell and multiple secondary cells. The user equipment unit comprises one or more processing circuits. The processing circuit is configured to perform the following operations: determining whether each of the multiple secondary cells experiences a beam failure; and if it is determined that beam failures have occurred on at least two of the multiple secondary cells, setting a medium access control control element (MAC CE) to notify the electronic apparatus of same, wherein the MAC CE at least comprises index information of all component carriers on which beam failures have occurred.

17 Claims, 16 Drawing Sheets

(56) References Cited

U.S. PATENT DOCUMENTS

| | | | | |
|---|---|---|---|---|
| 2021/0058913 | A1* | 2/2021 | Jang | H04W 24/08 |
| 2022/0061087 | A1* | 2/2022 | Koskela | H04W 72/21 |

FOREIGN PATENT DOCUMENTS

| | | | |
|---|---|---|---|
| CN | 109788564 | A | 5/2019 |
| CN | 110022613 | A | 7/2019 |
| CN | 110034799 | A | 7/2019 |
| CN | 110035502 | A | 7/2019 |
| CN | 110226340 | A | 9/2019 |
| EP | 3525516 | A1 | 8/2019 |
| KR | 20160110889 | A | 9/2016 |
| WO | WO-2019033072 | A1 | 2/2019 |
| WO | WO-2019124983 | A1 | 6/2019 |
| WO | WO-2019135654 | A1 | 7/2019 |

OTHER PUBLICATIONS

Asia Pacific Telecom., “Enhancements on Multi-beam Operations” 3GPP TSG-RAN WG1 Meeting #97, R1-1907360, May 13-17, 2019, 6 pages.

Samsung., “Enhancements on Multi-Beam Operations” 3GPP TSG RAN WG1 Meeting #94bis, R1-1810886, Oct. 8-12, 2018, 6 pages.

MediaTek Inc., “Enhancements on multi-beam operations”, 3GPP TSG RAN WG1#97 R1-1906537, May 13-17, 2019, Reno, USA.

Fujitsu, “Enhancements on Multi-beam Operation”, 3GPP TSG RAN WG1 #Ad-Hoc, R1-1900257, Jan. 21-25, 2019, Taipei, Taiwan.

Sony, “Enhancements on multi-beam operation”, 3GPP TSG RAN WG1 #96b, R1-1904241, Apr. 8-12, 2019, Xi’an, China.

Sony, “Enhancementson multi-beam operation” , 3GPP TSG RAN WG1 #97, R1-1906851, May 13-17, 2019, Reno, USA.

* cited by examiner

| Failed CC index | New beam ID |
|---|---|
| Failed CC index | New beam ID |
| Failed CC index | New beam ID |

| Failed CC index A1 | |
| --- | --- |
| | New beam ID A |
| Failed CC index Am | |

| Failed CC index B1 | |
| --- | --- |
| | New beam ID B |
| Failed CC index Bm | |

USER EQUIPMENT IN WIRELESS COMMUNICATION SYSTEM, ELECTRONIC APPARATUS, METHOD, AND STORAGE MEDIUM

CROSS-REFERENCE TO RELATED APPLICATIONS

The present application is based on PCT/CN2020/107690, filed Aug. 7, 2020, which claims priority to Chinese Patent Application No. 201910753424.8, titled "USER EQUIPMENT IN WIRELESS COMMUNICATION SYSTEM, ELECTRONIC APPARATUS, METHOD, AND STORAGE MEDIUM", filed on Aug. 15, 2019 with the China National Intellectual Property Administration, the entire contents of each are incorporated herein by reference in its entirety.

FIELD

The present disclosure relates to the technical field of wireless communications, and in particular to user equipment and an electronic device in a wireless communication system, a method for wireless communication in a wireless communication system, and a computer-readable storage medium.

BACKGROUND

In the current wireless communication system, a PCell (Primary Cell) and multiple SCells (Secondary Cells) are configured at a network side for a UE (user equipment) to communicate with a base station. For each of the multiple SCells, the UE performs beam failure detection to determine whether a beam used by the SCell fails. If a beam failure has happened, the UE notifies the network side of a beam failure event, and identification of the SCell in which the beam failure has happened and a new beam selected by the UE. After that, the network side uses the new beam selected by the UE to transmit a signal. When receiving the signal, the UE can determine that the new beam has been activated, that is, the beam failure recovery succeeds.

In an NR (New Radio) system of the fifth-generation (5G) mobile communication system, communication transmission operates in a high frequency band. Due to changes in transmission environment of millimeter waves, such as obstruction of people and buildings, rotation of the UE, and other factors, beam failures between the UE and the network may occur frequently. In addition, when the UE is configured with multiple SCells, the multiple SCells may be co-located, that is, the same downlink transmit beam is used. Therefore, if a beam failure occurs, beam failures may be happened in the multiple secondary cells at the same time. Whenever beam failure has happened in a secondary cell, the UE will notify the network side of a beam failure event, and correspondingly notify the identification of the SCell in which the beam failure has happened and the new beam selected by the UE. As a result, overhead of communication is relatively high.

Therefore, it is necessary to propose a technical solution to reduce overhead of communication when beam failure has happened in a secondary cell.

SUMMARY

This part provides a general summary of the present disclosure, rather than comprehensive disclosure of its full scope or all its features.

The object of the present disclosure is to provide user equipment and an electronic device in a wireless communication system, a method for wireless communication in a wireless communication system, and a computer-readable storage medium, so as to reduce overhead of communication when beam failure has happened in a secondary cell.

According to an aspect of the present disclosure, user equipment in a wireless communication system is provided. The user equipment is configured to communicate with an electronic device in the wireless communication system via a primary cell and multiple secondary cells. The user equipment includes one or more processing circuits, which are configured to perform the following operations: determining, for each of the multiple secondary cells, whether a beam failure has happened in the multiple secondary cell; and setting a single media access control-control element MAC CE to notify the electronic device when it is determined that the beam failure has happened in at least two of the multiple secondary cells. The MAC CE includes at least index information of all component carriers in which the beam failure has happened.

According to another aspect of the present disclosure, an electronic device in a wireless communication system is provided. The electronic device communicates with user equipment in the wireless communication system via a primary cell and multiple secondary cells. The electronic device includes: a transceiver, and one or more processing circuits configured to perform the following operations: causing the transceiver to receive a single media access control-control element MAC CE from the user equipment. The MAC CE includes at least index information of all component carriers in which the beam failure has happened.

According to another aspect of the present disclosure, a method for wireless communication in a wireless communication system is provided. The wireless communication system includes user equipment and an electronic device. The user equipment communicates with the electronic device via a primary cell and multiple secondary cells. The method includes: determining, for each of the multiple secondary cells, whether a beam failure has happened in the multiple secondary cell; and setting a single media access control-control element MAC CE to notify the electronic device when it is determined that the beam failure has happened in at least two of the multiple secondary cells. The MAC CE includes at least index information of all component carriers in which the beam failure has happened.

According to another aspect of the present disclosure, a method for wireless communication in a wireless communication system is provided. The wireless communication system includes user equipment and an electronic device. The user equipment communicates with the electronic device via a primary cell and multiple secondary cells. The method includes: receiving a single media access control-control element MAC CE from the user equipment. The MAC CE includes at least index information of all component carriers in which the beam failure has happened.

According to another aspect of the present disclosure, a computer-readable storage medium is provided. The computer-readable storage medium includes executable computer instructions that, when executed by a computer, cause the computer to perform the methods according to the present disclosure.

With the user equipment and the electronic device in a wireless communication system, the method for wireless communication in a wireless communication system, and the computer-readable storage medium according to the present disclosure, overhead of communication can be reduced when beam failure has happened in a secondary cell.

From the description provided here, further areas of applicability can become apparent. The description and specific examples in this summary are for illustrative purposes only, and are not intended to limit the scope of the present disclosure.

BRIEF DESCRIPTION OF THE DRAWINGS

The drawings described herein are only for the illustrative purpose of the selected embodiments, not all possible embodiments, and are not intended to limit the scope of the present disclosure. In the drawings.

Figure 1:
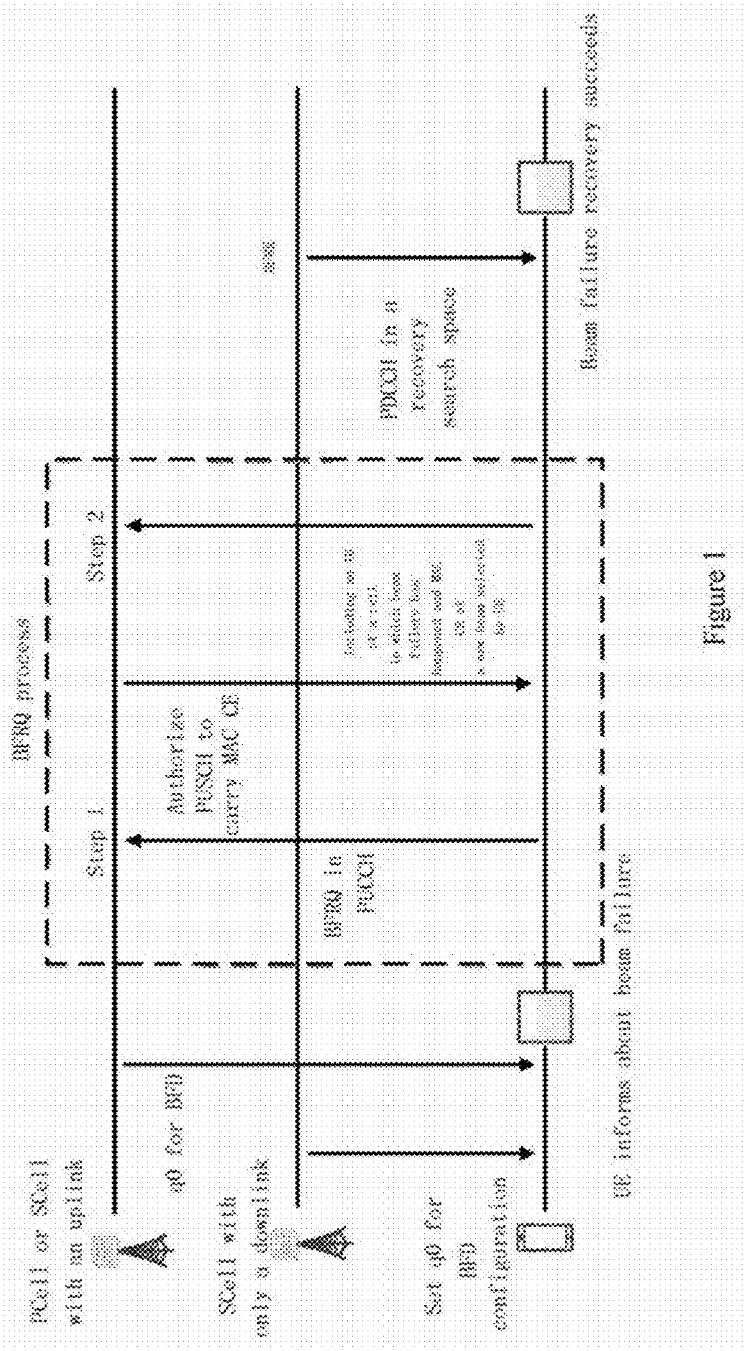
FIG. 1 is a schematic diagram showing a process of beam failure recovery between a UE and a network side known by the inventor.

Although the present disclosure is easily subjected to various modifications and alternative forms, specific embodiments thereof have been shown in the drawings as examples and described in detail herein. However, it should be understood that the description of specific embodiments herein is to cover all modifications, equivalents, and substitutions that fall within the spirit and scope of the present disclosure, rather than intended to limit the present disclosure to the specific forms disclosed. It should be noted that throughout the drawings, corresponding reference numerals indicate corresponding components.

DETAILED DESCRIPTION OF EMBODIMENTS

Examples of the present disclosure are described below more fully with reference to the drawings. The following description is merely illustrative in nature, and is not intended to limit the present disclosure, application, or use.

Illustrative embodiments are provided so that the present disclosure is thorough and the scope of the present disclosure is fully conveyed to those skilled in the art. Numerous specific details such as examples of specific components, devices, and methods are described to provide a detailed understanding of the embodiments of the present disclosure. It is clear to those skilled in the art that the example embodiments can be implemented in many different forms without using these specific details, and none of them should be construed as limiting the scope of the present disclosure. In some example embodiments, well-known processes, well-known structures, and well-known technologies are not described in detail.

UE (User Equipment) involved in the present disclosure includes but is not limited to terminals capable of wireless communication such as mobile terminals, computers, and vehicle-mounted devices. Further, depending on specific functions as described, the UE involved in the present disclosure may also be the UE itself or a component such as a chip in the UE. In addition, similarly, a base station involved in the present disclosure may be, for example, an eNB (evolution Node Base Station), a gNB (a base station in a 5th generation communication system), or a component such as a chip in an eNB or a gNB.

In the current wireless communication system, a PCell (Primary Cell) and multiple SCells (Secondary Cells) are configured at a network side for a UE (user equipment) to communicate with a base station. For each of the multiple SCells, the UE performs beam failure detection to determine whether a beam used by the SCell is in a failure state. If beam failure has happened, the UE will notify the network side of a beam failure event, and will notify the identification of the SCell in which the beam failure has happened and a new beam selected by the UE. After that, the network side uses the new beam selected by the UE to transmit a signal.

When receiving the signal, the UE can determine that the new beam has been activated, that is, beam failure recovery succeeds.

FIG. 1 is a schematic diagram showing a process of beam failure recovery between a UE and a network side known by the inventor. The UE communicates with a base station via a PCell or SCell with an uplink and a SCell with only a downlink.

As shown in FIG. 1, for example, the PCell or SCell with an uplink can transmit a q0 set (Reference Signal Set) for BFD (Beam Failure Detection) to the UE. The SCell with only a downlink can set the q0 set configured for the BFD in an explicit or implicit manner. For example, in the explicit configuration manner, the reference signal set q0 is a maximum of 2 periodic CSI-RS (Channel State Information Reference Signal) resources configured by the gNB on each SCell through RRC (Radio Resource Control) signaling for the UE. In the absence of the explicit configuration manner, the implicit configuration manner is adopted. In the implicit configuration manner, the UE can determine a reference signal included in the q0 set by itself. This reference signal has the same TCI (Transmission Configuration Indication) state (that is, the same beam direction) as the CORESET where the PDCCH (Physical Downlink Control Channel) is located.

Then, the UE determines whether there is a beam failure event based on the q0 set. For example, the UE determines whether a hypothetical BLER (Block Error Rate) of the PDCCH corresponding to the reference signal is too high based on the reference signal in q0, thereby determining whether the beam fails. If there is a beam failure event, the UE transmits a PUCCH (Physical Uplink Control Channel) to the PCell or SCell with an uplink to notify the beam failure event. For example, the UE transmits a BFRQ (Beam Failure Recovery Request) in the PUCCH.

Then, the PCell or SCell with an uplink authorizes a PUSCH (Physical Uplink Shared Channel) to carry a MAC CE (Media Access Control-Control Element). Next, the UE notifies an ID (Identification) of a cell in which the beam failure has happened and a new beam selected by the UE through the MAC CE. Finally, the UE receives the PDCCH sent by using the new beam in a specific PDCCH search space, that is, RecoverySearchSpace, to determine that the new beam has been activated, that is, the beam failure recovery succeeds.

However, in a case where the UE is configured with multiple SCells, the multiple SCells may be co-located, that is, the multiple SCells share a downlink transmit beam. Therefore, if there is beam failure, the multiple SCells share the failed beam may have beam failure at the same time. Whenever beam failure has happened in a SCell, the UE notifies the network side of a beam failure event, and notifies accordingly the identification of the SCell in which the beam failure has happened and the new beam selected by the UE. As a result, overhead of communication is relatively high.

Figure 2:
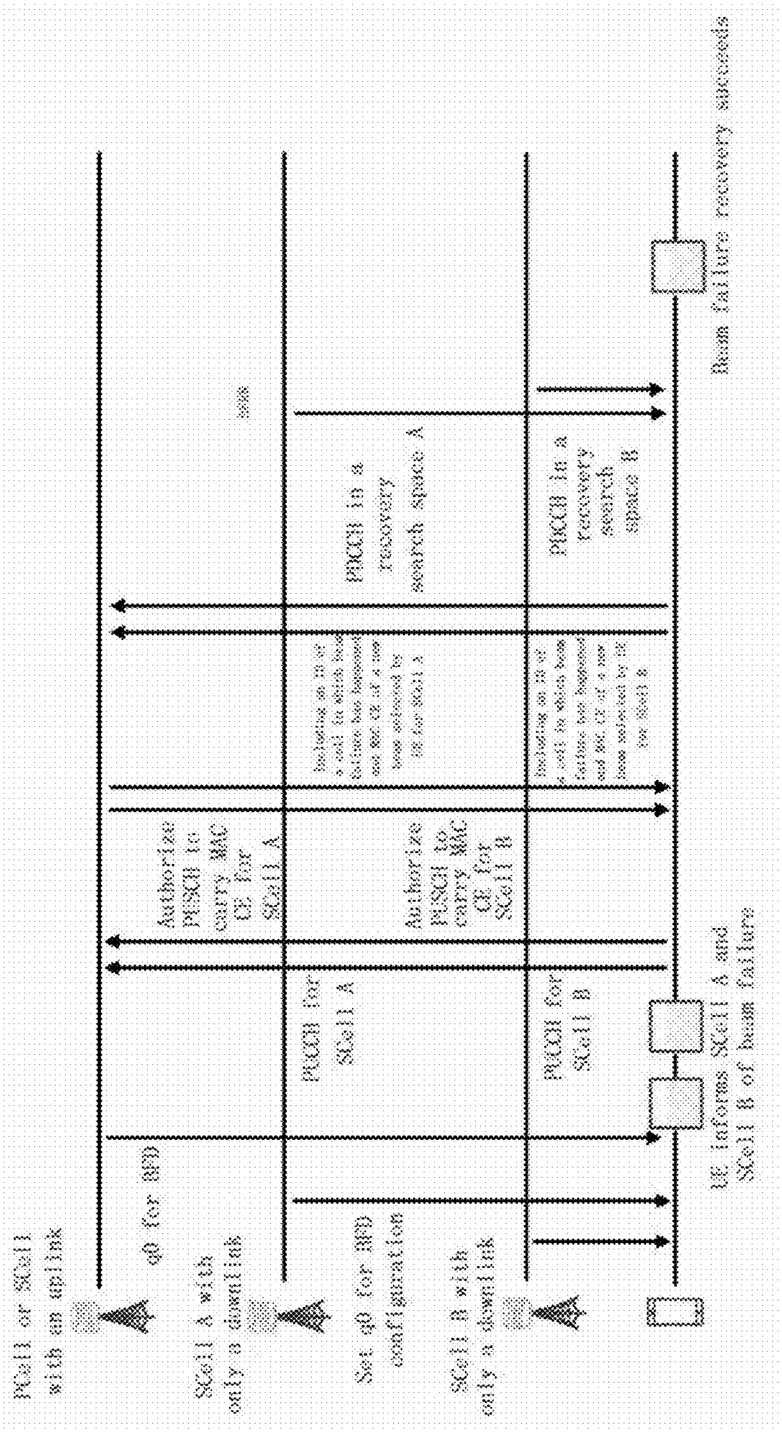
FIG. 2 is a schematic diagram showing another process of beam failure recovery between a UE and a network side known by the inventor.

FIG. 2 is a schematic diagram showing another process of beam failure recovery between a UE and a network side known by the inventor. The UE communicates with the base station via a PCell or SCell with an uplink and two SCells A and B each with only a downlink.

As shown in FIG. 2, for example, the PCell or SCell with an uplink transmits a q0 set for the BFD to the UE. The SCells A and B each with only a downlink set the q0 set configured for the BFD in an explicit or implicit manner. Then, the UE determines whether there is a beam failure event in the SCell A and the SCell B based on the q0 set received from the SCell A and the SCell B, respectively. Assuming that a beam failure event happens, the UE transmits a PUCCH for the SCell A and a PUCCH for the SCell B to the PCell or SCell with an uplink to notify the beam failure event. Then, the PCell or SCell with an uplink authorizes a PUSCH to carry a MAC CE for the SCell A and a PUSCH to carry a MAC CE for the SCell B. Next, the UE notifies the PCell or SCell with an uplink of an ID of a cell in which the beam failure has happened and a new beam selected by the UE through the MAC CE for the SCell A, and an ID of a cell in which the beam failure has happened and a new beam selected by the UE through the MAC CE for the SCell B. Finally, the UE receives PDCCHs sent by using the new beam in a specific PDCCH search space, namely a recovery search space A for the SCell A and a recovery search space B for the SCell B, to determine that the new beam has been activated, that is, beam failure recovery succeeds. Specifically, if the corresponding beam is received in the recovery search space A, it is considered that the beam recovery for the SCell A succeeds; on the contrary, if no beam is received in the recovery search space A, it is considered that the beam recovery for the SCell A does not succeed. The beam recovery for the SCell B is similar to that for the SCell A, and thus is not described in detail herein.

However, in the case where the multiple SCells are co-located, for example, for the SCell A and the SCell B that are co-located, it is unnecessary for the UE to search the recovery search space A for the SCell A and the recovery search space B for the SCell B to confirm the activation of the new beam.

Figure 3:
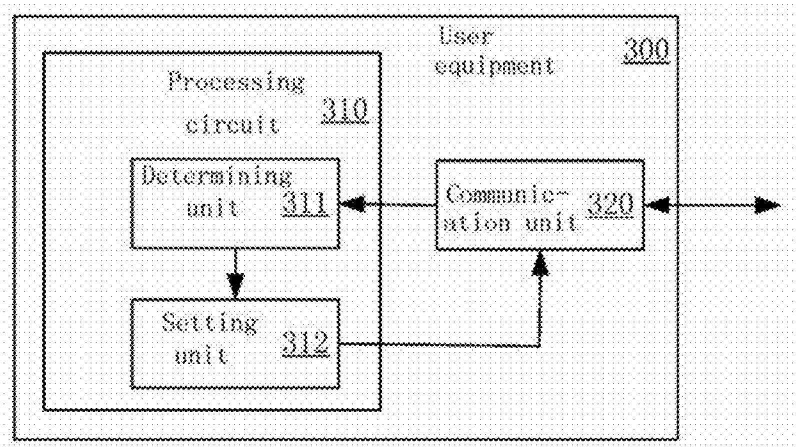
FIG. 3 shows a structure of a UE 300 in a wireless communication system according to an embodiment of the present disclosure.

In order to solve at least one of the above-mentioned problems, technical solutions according to the present disclosure are proposed. FIG. 3 shows a structure of a UE 300 in a wireless communication system according to an embodiment of the present disclosure.

As shown in FIG. 3, the UE 300 includes a processing circuit 310. It should be noted that the UE 300 may include one processing circuit 310 or multiple processing circuits 310. In addition, the UE 300 may include a communication unit 320 and the like.

Further, the processing circuit 310 may include various discrete functional units to perform various functions and/or operations. It should be noted that these functional units may be physical entities or logical entities, and units with different titles may be implemented by the same physical entity.

According to an embodiment of the present disclosure, as shown in FIG. 3, the processing circuit 310 includes a determining unit 311 and a setting unit 312.

The determining unit 311 is configured to determine, for each of the multiple secondary cells, whether beam failure has happened in the secondary cell.

The setting unit 312 is configured to set a single media access control-control element MAC CE to notify the network side of a beam failure event when the determining unit 311 determines that the beam failure has happened in at least two of the multiple secondary cells.

According to an embodiment of the present disclosure, the MAC CE includes index information of all CCs (Component Carrier) in which the beam failure has happened. Here, it should be clear to those skilled in the art that the present disclosure is not limited to this, and the MAC CE may of course include other information such as a new beam selected by the UE.

Figure 4:
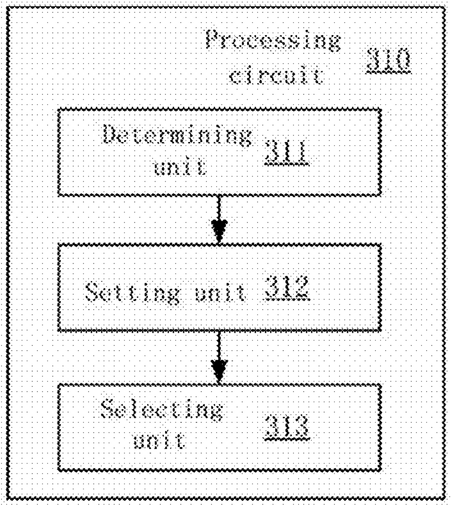
FIG. 4 shows a structure of a processing circuit 310 in the UE 300 in the wireless communication system according to an embodiment of the present disclosure.

For example, according to an embodiment of the present disclosure, as shown in FIG. 4, the processing circuit 310 may further include a selecting unit 313.

The selecting unit 313 is configured to select, for each secondary cell in which the beam failure has happened, select a new beam based on a candidate reference signal set q1 for beam failure recovery. According to this embodiment, the MAC CE further includes identification information of the new beam selected by the UE. Here, the identification information of the new beam corresponds to the index information of a failed CC.

Figure 5A:
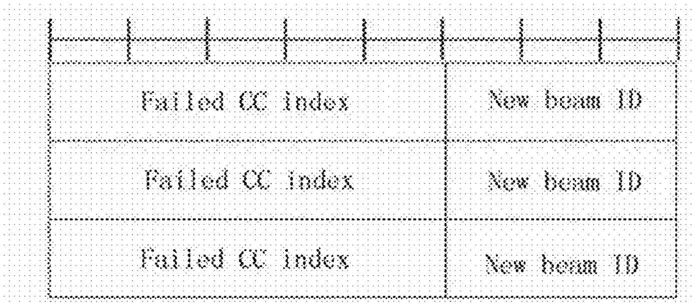
FIG. 5A is a schematic diagram showing formats of multiple MAC CEs according to an embodiment of the present disclosure.

Reference is made to FIG. 5A, which schematically shows three MAC CEs. Each MAC CE is represented by 8 bits. The first 5 bits of a MAC CE indicate the index information of the failed CC, and the last 3 bits of the MAC CE indicate the ID of the new beam. However, in a case where multiple SCells A1 to Am are quasi co-located, that is, share the same downlink transmit beam and select the same new beam A, and multiple SCells B1 to Bm are quasi co-located and select the same new beam B, then multiple MAC CEs are implemented by to a single MAC CE, so that effective load of the MAC CE is reduced.

Figure 5B:
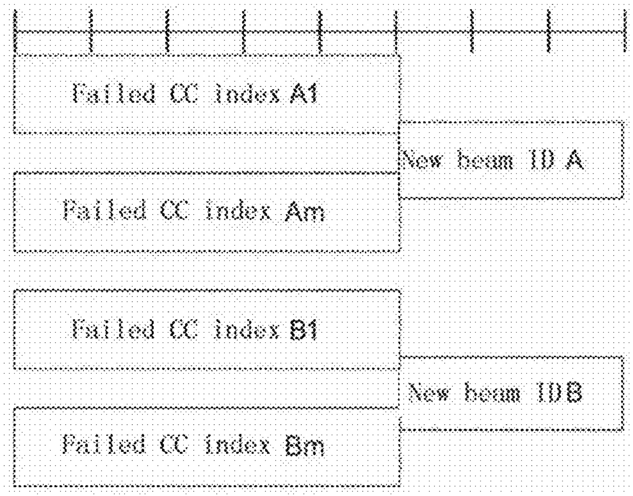
FIG. 5B is a schematic diagram showing a process of omitting from the multiple MAC CEs shown in FIG. 5A to a single MAC CE.

For example, as shown in FIG. 5B, a failed CC index A1 to a failed CC index Am are grouped into the same group, and the MAC CE is set so that the multiple indexes A1 to Am in the group correspond to a single new beam ID A. Similarly, a failed CC index B1 to a failed CC index Bm are grouped into the same group, and the MAC CE is set so that the multiple indexes B1 to Bm in the group correspond to a single new beam ID B. Therefore, the effective load of the MAC CE is reduced.

In order to set the MAC CE more reasonably, according to an embodiment of the present disclosure, the setting unit 312 is further configured to set the MAC CE so that the MAC CE includes information indicating a length of a group.

Since the current protocol only supports transmission of two different site addresses, recovery is performed based on two groups, namely a group A and a group B. It should be clear to those skilled in the art that the technical solutions can be extended to a case of more than two groups.

Figure 6:
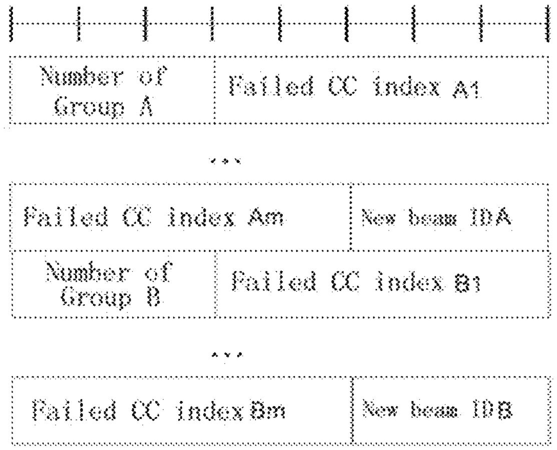
FIG. 6 is a schematic diagram of the MAC CE in a grouping manner according to an embodiment of the present disclosure.

For example, as shown in FIG. 6, the number of SCells in which the beam failure has happened in each group, such as the group A, is set at the beginning of each reported MAC CE. Next, index information A1 to Am of failed CCs is reported. Finally, an ID A of a new beam is reported. Next, the number of SCells in which the beam failure has happened in group B is reported. Then, index information B1 to Bm of failed CCs is reported. Finally, an ID B of a new beam is reported.

Correspondingly, in the case that multiple SCells are quasi co-located, according to an embodiment of the present disclosure, the network side transmits a BFRR (Beam Failure Recovery Response) to the UE in a grouping manner.

Figure 7:
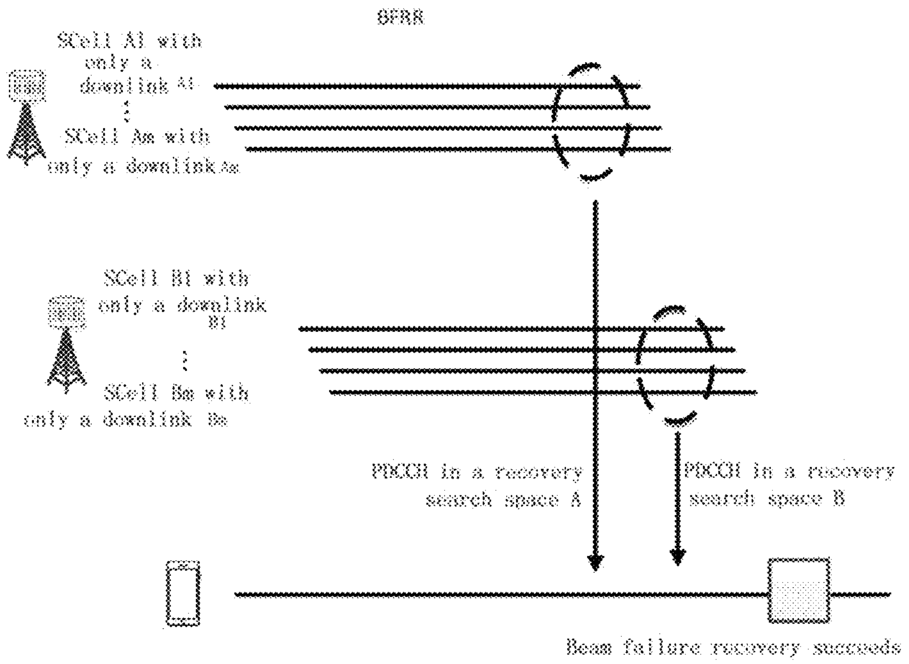
FIG. 7 is a schematic diagram showing a process that the network side transmits a BFRR to the UE in a grouping manner according to an embodiment of the present disclosure.

For example, FIG. 7 is a schematic diagram showing a process that the network side transmits a BFRR to the UE in a grouping manner. SCells A1 to Am each with only a downlink are in the same group, which is referred to as group A. SCells B1 to Bm each with only a downlink are in the same group, which is referred to as a group B. The network side transmits a PDCCH of a BFRR to all SCells in one of the A group and the B group, thereby reducing downlink signaling overhead on the network side. For example, the network side transmits a PDCCH of the BFRR for the group A to the UE. Similarly, the network side transmits a PDCCH of the BFRR for the group B to the UE.

Next, the SCells A1 to Am in a group, that is, the group A, have the same new beam. The SCells B1 to Bm in a group, that is, the group B, have the same new beam. If the UE finds a PDCCH in the recovery search space in any SCell in a group, the UE considers that the beam failure recovery for this group of SCells succeeds. For example, if the UE finds the PDCCH in the recovery search space in the SCell A1 in the group A, the UE considers that the beam failure recovery for all the SCells in the group A succeeds. If the UE finds the PDCCH in the recovery search space in the SCell B1 in the group B, the UE considers that the beam failure recovery for all the SCells in the group B succeeds.

In addition, it should be clear to those skilled in the art that even if the network side does not transmit the BFRR to the UE in the grouping manner, that is, the network side transmits a BFRR for each SCell in each group, the UE also considers that the beam failure recovery for all SCells in the group succeeds as long as the UE finds a PDCCH in a recovery search space for the group. In this way, the UE is prevented from performing additional busy detection of the downlink control channel.

Different from the technical solution of transmitting a BFRR to the UE in multiple SCells, the PCell also transmits a BFRR to the UE for multiple SCells.

Figure 8:
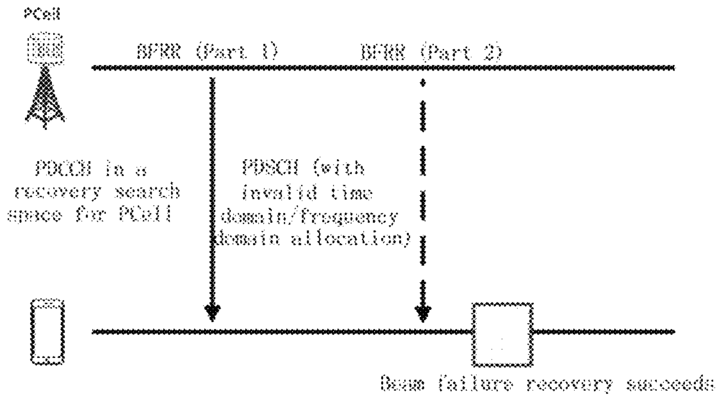
FIG. 8 is a schematic diagram showing a process that a PCell transmits partial BFRR according to an embodiment of the present disclosure.

As shown in FIG. 8, a BFRR sent by the PCell to the UE is divided into two parts, namely, a part 1 and a part 2. The part 1 is similar to the case of transmitting the BFRR to the UE in multiple SCells. As long as the PDCCH is found in the recovery search space of the PCell, such as RecoverySearchSpaceForSCell, the UE determines that the new beam has been activated, that is, the beam failure recovery succeeds.

In part 2, in order to reduce overhead, the PDSCH (Physical Downlink Shared Channel) resource scheduled by the PDCCH is invalid. For example, a frequency domain resource of the scheduled PDSCH is set to ORB, or the number of OFDM symbols of a time domain resource is set to 0.

Figure 9:
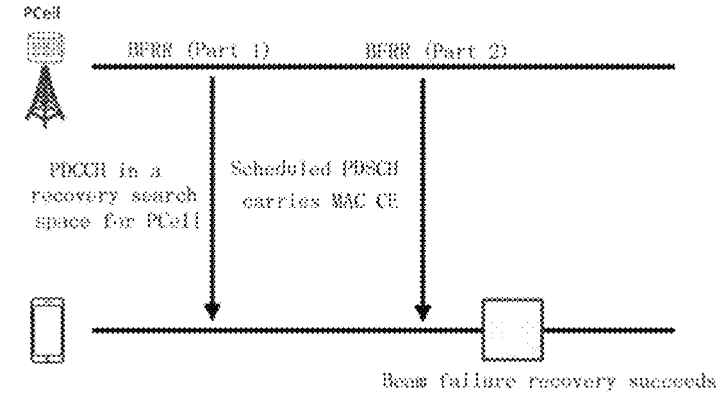
FIG. 9 is a schematic diagram showing a process that a PCell transmits BFRR in two parts according to an embodiment of the present disclosure.

However, in order to include more dimensional information in the BFRR, as shown in FIG. 9, in part 1 the UE determines that the beam failure recovery succeeds as long as a PDCCH in the recovery search space of the PCell is found. In part 2, the PDSCH scheduled by the PDCCH is used to carry more information to the UE. For example, the MAC CE included in the BFRR sent by the PCell may indicate whether the new beam selected by the UE for each SCell is accepted by the network side. If the new beam is not accepted by the network side, the network side specifies an ID of a new beam, such as the CSI-RS resource index or the SSB index. Here, a format of the MAC CE of the PCell is similar to that shown in FIG. 5A. Each MAC CE is represented by 8 bits, the first 5 bits of the MAC CE indicate index information of the failed CC, and the last 3 bits indicate the ID of the new beam.

As described above, for each SCell, the UE is configured with two reference signal sets q0 and q1. q0 is a reference signal set for beam failure detection, and q1 is a candidate reference signal set for beam failure recovery. When a new beam that meets the quality requirements is not found from q1, the UE reports information indicating that there is no new beam to the network side, and reselects a new beam by an asynchronous downlink beam scanning process triggered by the network side.

Figure 10:
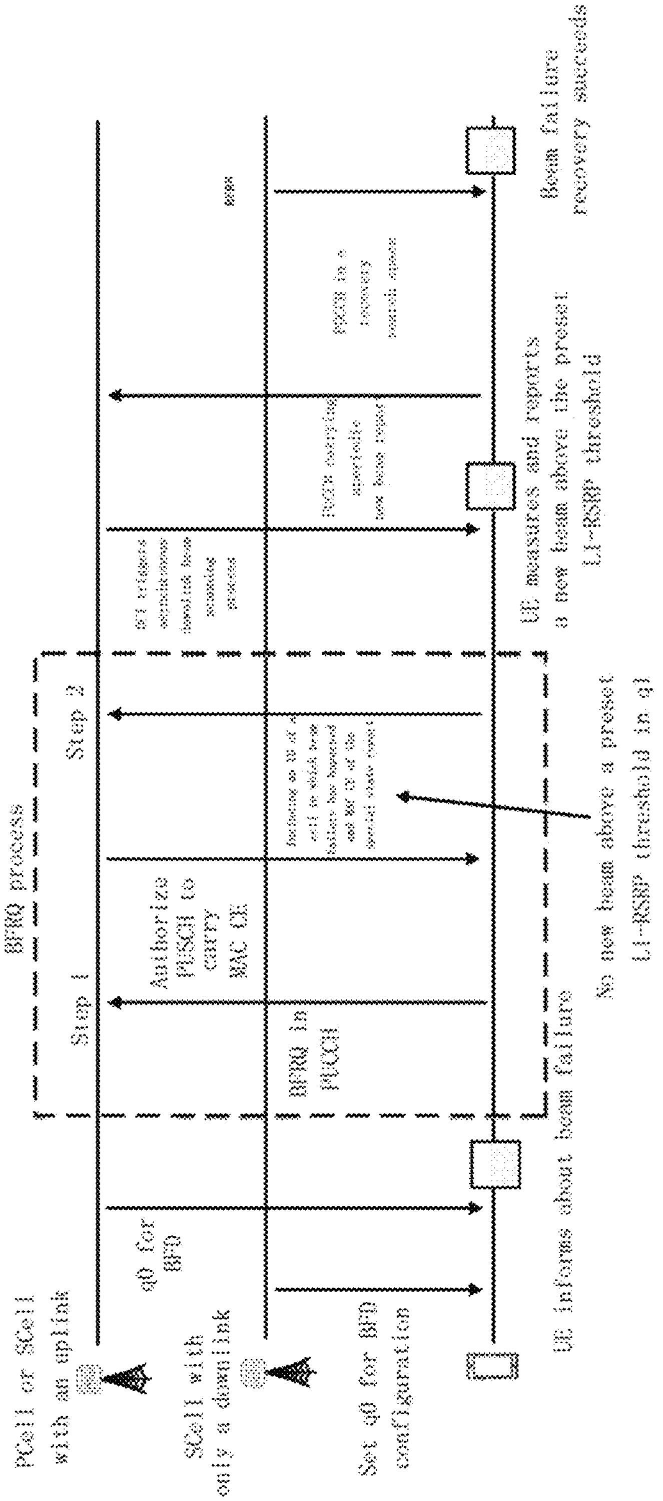
FIG. 10 is a schematic diagram showing interaction between a UE and a network side in a case where the UE does not find a new beam that meets quality requirements from q1 according to an embodiment of the present disclosure.

As shown in FIG. 10, in a BFRQ process, if the UE does not find a new beam that meets the quality requirements from q1, for example, a L1-RSRP (Lay 1-Reference Signal Receiving Power) being above a certain threshold, the UE reports a special state of a new beam to the network side. According to a preferred embodiment of the present disclosure, this special state is reported in the PUCCH. When receiving the report of this special state, the network side triggers the asynchronous downlink beam scanning process through DCI. After measuring the downlink beam, the UE feeds back a beam with best beam quality to the network side as the new beam.

Figure 11:
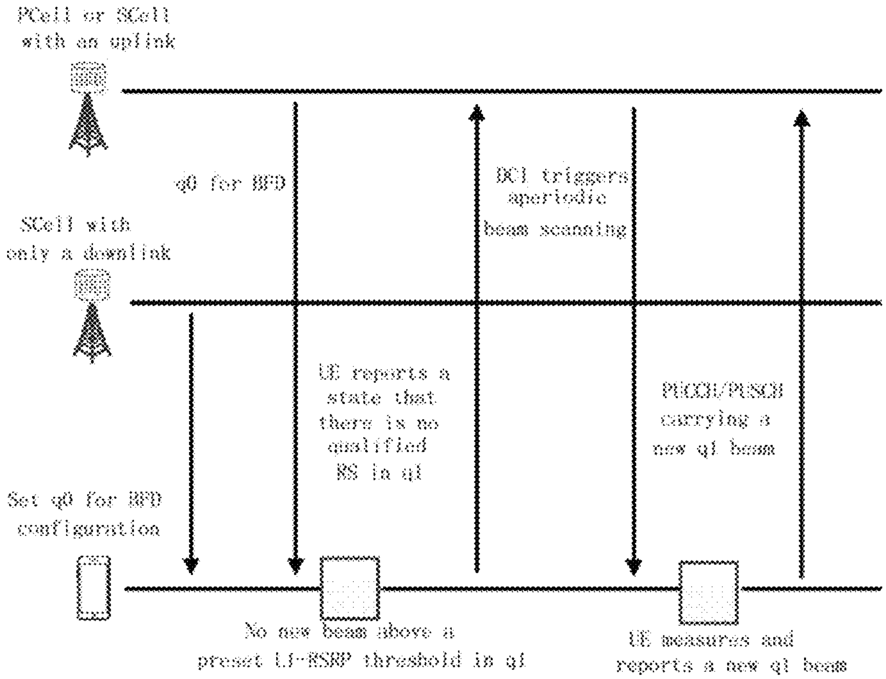
FIG. 11 is a schematic diagram showing interaction between a UE and a network side in a case where pre-processing of BFR has not happened according to an embodiment of the present disclosure.

When finding that there is no new beam candidate in q1 above the L1-RSRP threshold, the UE informs the network side of the situation through PUCCH/PUSCH and requests an aperiodic beam scanning process and performs reporting even if the quality of the beam in q0 is still good, as shown in FIG. 11.

Figure 12:
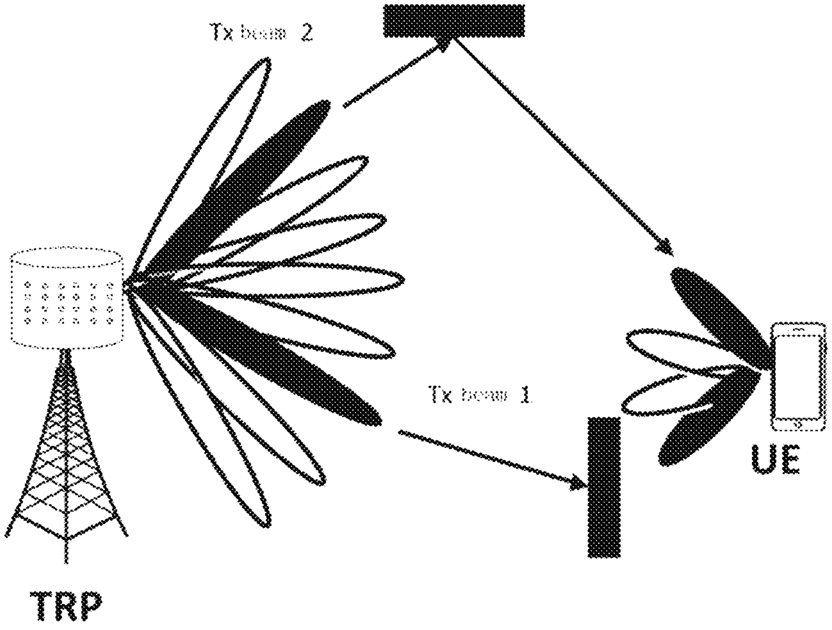
FIG. 12 is a schematic diagram showing transmission and reception in which some beams are of poor quality and another part of beams are of good quality.

For the current protocol, only when all the beams in q0 are of poor quality, it is considered a BFR case. However, as shown in FIG. 12, the RS corresponding to a Tx beam 1 and the RS corresponding to a Tx beam 2 are both in the q0 set, but the quality of the Tx beam 1 is poor. In this case, the UE does not report the BFR case to the MAC CE because the quality of the Tx beam 2 is always better.

Therefore, in order to solve the above problem, according to an embodiment of the present disclosure, a partial beam failure state is determined based on the reference signal set q0 for beam failure detection. In the partial beam failure state, only a part of the reference signals in the q0 are in a bad channel condition, and the UE reports information indicating that the part of the reference signals are in a bad channel condition to the network side. Further, the UE resets the q0 based on a message from the network side.

Figure 13:
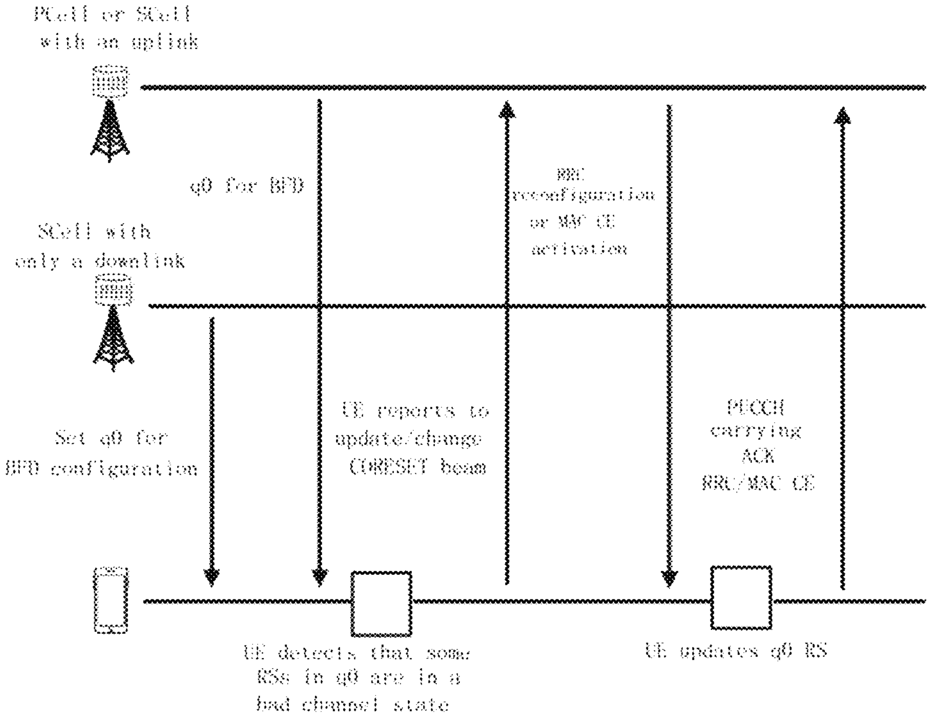
FIG. 13 is a schematic diagram show partially recovery of the downlink transmit beam in q0 according to an embodiment of the present disclosure.

For example, as shown in FIG. 13, when detecting that some RSs in q0 are in a poor channel condition, the UE reports to the network side to update/change the CORESET beams corresponding to these RSs in q0. Then, the network side issues RRC reconfiguration signaling or activation through MAC CE. Next, the UE carries ACK through the PUCCH to indicate successful receipt of the RRC reconfiguration or MAC CE activation issued by the network side.

According to an embodiment of the present disclosure, the network side includes a base station or TRP (Transmit/Receive port).

With the user equipment in the wireless communication system according to the present disclosure, communication overhead when a beam failure has happened in a secondary cell is reduced.

Next, an electronic device 1400 in a wireless communication system according to another embodiment of the present disclosure is described with reference to FIG. 14.

Figure 14:
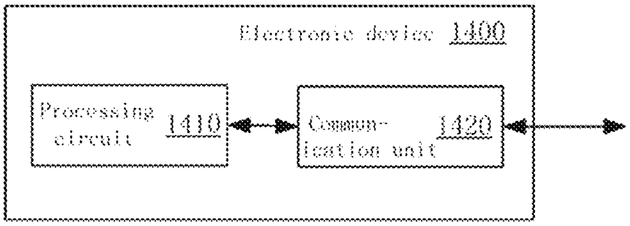
FIG. 14 is a block diagram showing a structure of an electronic device in a wireless communication system according to another embodiment of the present disclosure.

FIG. 14 shows a structure of an electronic device 1400 in a wireless communication system according to another embodiment of the present disclosure.

As shown in FIG. 14, the electronic device 1400 includes a processing circuit 1410. It should be noted that the electronic device 1400 may include one processing circuit 1410 or multiple processing circuits 1410. In addition, the electronic device 1400 furthers include a communication unit 1420 such as a transceiver and the like.

As mentioned above, similarly, the processing circuit 1410 also includes various discrete functional units to perform various functions and/or operations. These functional units are physical entities or logical entities, and units of different titles may be implemented by the same physical entity.

The processing circuit 1410 may enable the communication unit 1420 to receive a single media access control-control element MAC CE from the user equipment. The MAC CE includes at least index information of all component carriers in which beam failure has happened.

Preferably, the processing circuit 1410 is further configured to perform the following operation: performing a beam failure recovery response based on the index information, so as to activate a new beam.

Preferably, the MAC CE further includes identification information of the new beam selected by the user equipment, and the identification information corresponds to the index information.

Preferably, when at least two pieces of identification information are the same, multiple pieces of index information corresponding to the same identification information are divided into a group. The MAC CE is set such that the multiple pieces of index information in the group correspond to a single piece of identification information.

Preferably, the MAC CE is set such that the MAC CE includes information indicating a length of the group.

Preferably, the processing circuit 1410 is further configured to perform the following operations: causing the communication unit 1420 to transmit a physical downlink control channel PDCCH signal in the recovery search space of any one or more or all of the secondary cells corresponding to the multiple pieces index information in the group, as a beam failure recovery response BFRR.

Preferably, the processing circuit 1410 is further configured to perform the following operation: causing the communication unit 1420 to transmit the physical downlink control channel PDCCH signal in the recovery search space of the primary cell.

Preferably, the processing circuit 1410 is further configured to perform the following operations: reselecting a new beam for the component carrier that has beam failure; setting the physical downlink shared channel PDSCH signal scheduled by the PDCCH signal so that the PDSCH signal includes the identification information of the newly selected new beam; and causing the communication unit 1420 to transmit the PDSCH signal.

Preferably, the processing circuit 1410 is further configured to perform the following operation: when receiving information indicating that there is no new beam from the user equipment, triggering an asynchronous downlink beam scanning process, so that the user equipment reselects a new beam.

Preferably, the processing circuit 1410 is further configured to perform the following operations: when receiving information from the user equipment indicating that only a part of the reference signals in the reference signal set q0 for beam failure detection are in a bad channel condition, reconfigure the q0 to notify the user equipment.

It should be noted that, according to the embodiments of the present disclosure, the wireless communication system described above is a 5G new wireless NR system, and the electronic device 1400 is a base station or a TRP.

Figure 15:
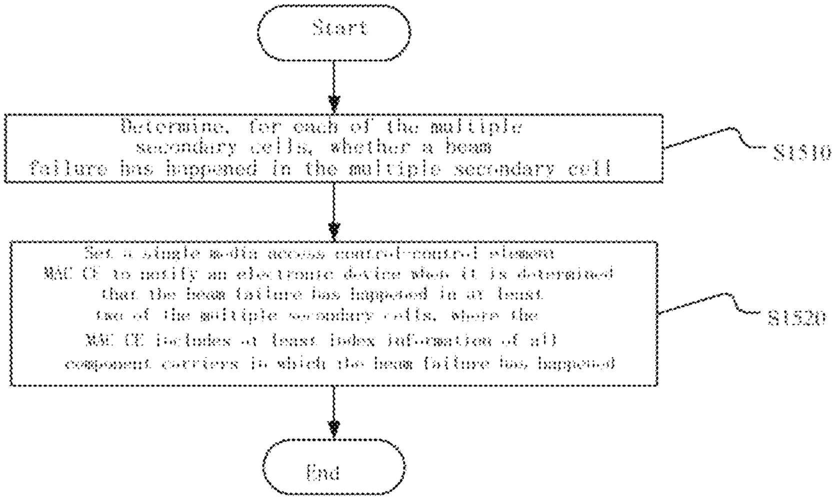
FIG. 15 is a flowchart showing a method for wireless communication according to an embodiment of the present disclosure.

Next, a method for wireless communication in a wireless communication system according to an embodiment of the present disclosure is described with reference to FIG. 15. FIG. 15 shows a flowchart of a wireless communication method according to an embodiment of the present disclosure.

As shown in FIG. 15, first, in step S1510, it is determined for each of the multiple secondary cells, whether a beam failure has happened in the multiple secondary cell.

Then, in step S1520, when it is determined that beam failure has happened in at least two of the multiple secondary cells, a single media access control-control element MAC CE is set to notify the electronic device. The MAC CE includes at least index information of all component carriers in which beam failure has happened.

Preferably, according to an embodiment of the present disclosure, the method for wireless communication further includes: for each secondary cell in which the beam failure has happened, selecting a new beam based on a candidate reference signal set q1 for beam failure recovery. The MAC CE further includes identification information of the selected new beam, and the identification information corresponds to the index information.

Preferably, according to an embodiment of the present disclosure, the method for wireless communication further includes: when at least two pieces of identification information are the same, dividing multiple pieces of index information corresponding to the same identification information into a group; and setting the MAC CE, such that the multiple pieces of index information in the group correspond to a single piece of identification information.

Preferably, according to an embodiment of the present disclosure, the method for wireless communication further includes: setting the MAC CE, such that the MAC CE includes information indicating a length of the group.

Preferably, according to an embodiment of the present disclosure, the method for wireless communication further includes: searching for a physical downlink control channel PDCCH signal in the recovery search space of any one of the secondary cells corresponding to the multiple pieces of index information in the group; and stopping the busy detection of the recovery search space of each of the secondary cells corresponding to the multiple pieces of index information in the group when a PDCCH signal is detected.

Preferably, according to an embodiment of the present disclosure, the method for wireless communication further includes: searching for a physical downlink control channel PDCCH signal in the recovery search space of the primary cell.

Preferably, according to an embodiment of the present disclosure, the method for wireless communication further includes: acquiring, from the physical downlink shared channel PDSCH signal scheduled by the PDCCH signal, identification information of a new beam reselected by the electronic device for the component carrier in which the beam failure has happened.

Preferably, according to an embodiment of the present disclosure, the method for wireless communication further includes: when a new beam cannot be selected based on the q1, reporting information indicating that there is no new beam to the electronic device; and reselecting a new beam by an asynchronous downlink beam scanning process triggered by the electronic device.

Preferably, according to an embodiment of the present disclosure, the method for wireless communication further includes: for each of the multiple secondary cells, preselecting a new beam based on the candidate reference signal set q1 for beam failure recovery; when a new beam cannot be selected based on the q1, reporting information indicating that there is no new beam to the electronic device; and reselecting a new beam by an asynchronous downlink beam scanning process triggered by the electronic device.

Preferably, according to an embodiment of the present disclosure, when determining, for each of the multiple secondary cells, whether beam failure has happened in the secondary cell, the method for wireless communication further includes: determining a partial beam failure state based on the reference signal set q0 for beam failure detection, where in the partial beam failure state, only a part of the reference signals in the q0 are in a bad channel condition; reporting information indicating that the part of the reference signal is in a poor channel condition to the electronic device; and resetting the q0 based on a message from the electronic device.

According to another embodiment of the present disclosure, a method for wireless communication in a wireless communication system is further provided. The wireless communication system includes user equipment and an electronic device. The user equipment communicates with the electronic device via a primary cell and multiple secondary cells. The method includes receiving a single media access control-control element MAC CE from the user equipment. The MAC CE includes at least index information of all component carriers in which beam failure has happened.

Preferably, the method according to another embodiment of the present disclosure further includes: performing a beam failure recovery response based on the index information to activate a new beam.

Preferably, according to the method of another embodiment of the present disclosure, the MAC CE further includes identification information of the new beam selected by the user equipment, and the identification information corresponds to the index information.

Preferably, according to the method of another embodiment of the present disclosure, when at least two pieces of the identification information are the same, multiple pieces of index information corresponding to the same identification information are divided into a group, and the MAC CE is set such that multiple pieces of index information in the group corresponds to a single piece of identification information.

Preferably, according to the method of another embodiment of the present disclosure, the MAC CE is set such that the MAC CE includes information indicating a length of the group.

Preferably, the method according to another embodiment of the present disclosure further includes: transmitting a physical downlink control channel PDCCH signal in the recovery search space of any one or more or all of the secondary cells corresponding to the multiple pieces of index information in the group, as the beam failure recovery response BFRR.

Preferably, the method according to another embodiment of the present disclosure further includes: causing the transceiver to transmit a physical downlink control channel PDCCH signal in the recovery search space of the primary cell.

Preferably, the method according to another embodiment of the present disclosure further includes: reselecting a new beam for the component carrier that has beam failure; setting the physical downlink shared channel PDSCH signal scheduled by the PDCCH signal so that the PDSCH signal includes the identification information of the selected new beam; and transmitting the PDSCH signal.

Preferably, the method according to another embodiment of the present disclosure further includes: when receiving information indicating that there is no new beam from the user equipment, triggering an asynchronous downlink beam scanning process, so that the user equipment reselects a new beam.

Preferably, the method according to another embodiment of the present disclosure further includes: when receiving information from the user equipment indicating that only a part of the reference signals in the reference signal set q0 for beam failure detection are in a poor channel condition, reconfiguring the q0 to notify the user equipment.

Various specific implementations of the foregoing steps of the method for wireless communication in a wireless communication system according to the embodiments of the present disclosure have been described in detail above, and the description is not repeated here.

In addition, it should be noted that, according to another embodiment of the present disclosure, a computer-readable storage medium is also provided. The storage medium includes executable computer instructions which, when executed by a computer, enable the computer to perform the method according to the embodiments of the present disclosure.

The technology of the present disclosure is applicable to various products. For example, the base station mentioned in this disclosure may be implemented as any type of evolved Node B (eNB), such as a macro eNB and a small eNB. A small eNB may be an eNB that covers a cell smaller than a macro cell, such as a pico eNB, a micro eNB, and a home (femto) eNB. Instead, the base station may be implemented as any other type of base station, such as a NodeB and a base transceiver station (BTS). The base station may include: a main body (also referred to as a base station device) configured to control wireless communication; and one or more remote wireless heads (RRH) set in a place different from the main body. In addition, various terminals to be described below can all operate as a base station by temporarily or semi-persistently performing functions of the base station.

For example, the UE mentioned in the present disclosure may be implemented as a mobile terminal (such as a smart phone, a tablet personal computer (PC), a notebook PC, a portable game terminal, a portable/dongle type mobile router, and a digital camera) or a vehicle-mounted terminal (such as a vehicle navigation device). The UE may also be implemented as a terminal (also referred to as a machine type communication (MTC) terminal) that performs machine-to-machine (M2M) communication. In addition, the UE may be a wireless communication module (such as an integrated circuit module including a single chip) mounted on each of the above-mentioned terminals.

Figure 16:
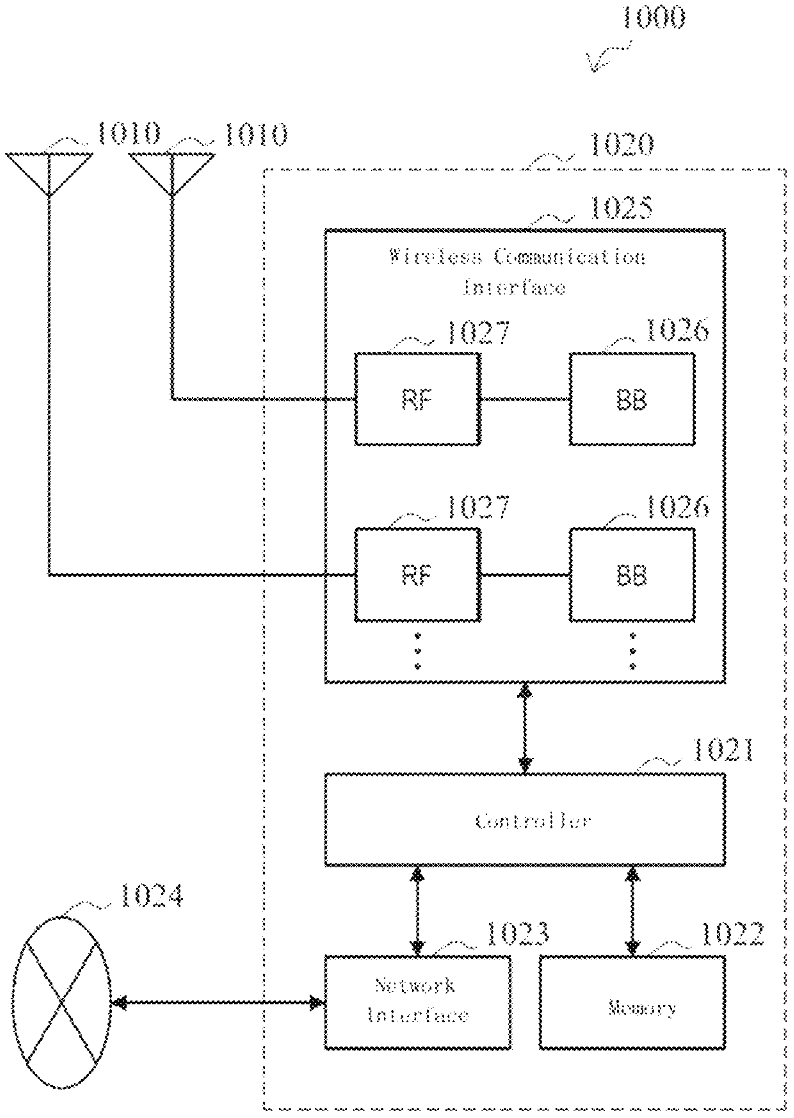
FIG. 16 is a block diagram showing a first example of a schematic configuration of an eNB (evolution Node Base Station) or gNB (a base station in a 5th generation communication system) applicable to the present disclosure.

FIG. 16 is a block diagram showing a first example of a schematic configuration of an eNB to which the technology of the present disclosure may be applied. The eNB 1000 includes one or more antennas 1010 and a base station device 1020. Each antenna 1010 and the base station device 1020 can be connected to each other via an RF cable.

Each of the antennas 1010 includes a single or multiple antenna elements (such as multiple antenna elements included in a multiple input multiple output (MIMO) antenna), and is used for the base station device 1020 to transmit and receive wireless signals. As shown in FIG. 16, the eNB 1000 may include multiple antennas 1010. For example, the multiple antennas 1010 may be compatible with multiple frequency bands used by the eNB 1000. Although FIG. 16 shows an example in which the eNB 1000 includes multiple antennas 1010, the eNB 1000 may also include a single antenna 1010.

The base station device 1020 includes a controller 1021, a memory 1022, a network interface 1023, and a wireless communication interface 1025.

The controller 1021 may be, for example, a CPU or a DSP, and operates various functions of higher layers of the base station device 1020. For example, the controller 1021 generates a data packet based on data in a signal processed by the wireless communication interface 1025, and transmits the generated packet via the network interface 1023. The controller 1021 may bundle data from multiple baseband processors to generate a bundled packet, and transfer the generated bundled packet. The controller 1021 may have a logical function for performing control such as radio resource control, radio bearer control, mobility management, admission control, and scheduling. This control may be performed in conjunction with a nearby eNB or core network node. The memory 1022 includes a RAM and a ROM, and stores programs executed by the controller 1021 and various types of control data (such as a terminal list, transmission power data, and scheduling data).

The network interface 1023 is a communication interface for connecting the base station device 1020 to the core network 1024. The controller 1021 may communicate with a core network node or another eNB via a network interface 1023. In this case, the eNB 1000 and the core network node or other eNBs can be connected to each other via a logical interface (such as an S1 interface and an X2 interface). The network interface 1023 may also be a wired communication interface or a wireless communication interface for a wireless backhaul line. If the network interface 1023 is a wireless communication interface, the network interface 1023 can use a higher frequency band for wireless communication than the frequency band used by the wireless communication interface 1025.

The wireless communication interface 1025 supports any cellular communication scheme, such as Long Term Evolution (LTE) and LTE-Advanced, and provides wireless connection to terminals located in the cell of the eNB 1000 via the antenna 1010. The wireless communication interface 1025 may generally include, for example, a baseband (BB) processor 1026 and an RF circuit 1027. The BB processor 1026 may perform, for example, encoding/decoding, modulation/demodulation, and multiplexing/demultiplexing, and perform various types of signal processing of layers (such as L1, medium access control (MAC), radio link control (RLC), and packet data convergence protocol (PDCP)). Instead of the controller 1021, the BB processor 1026 may have a part or all of the above-mentioned logical functions. The BB processor 1026 may be a memory storing a communication control program, or a module including a processor and related circuits configured to execute the program. The function of the BB processor 1026 is changed by updating the program. The module may be a card or a blade inserted into a slot of the base station device 1020. Alternatively, the module is a chip mounted on a card or blade. Further, the RF circuit 1027 may include, for example, a mixer, a filter, and an amplifier, and transmit and receive wireless signals via the antenna 1010.

As shown in FIG. 16, the wireless communication interface 1025 may include multiple BB processors 1026. For example, the multiple BB processors 1026 may be compatible with multiple frequency bands used by the eNB 1000. As shown in FIG. 16, the wireless communication interface 1025 may include multiple RF circuits 1027. For example, the multiple RF circuits 1027 may be compatible with multiple antenna elements. Although FIG. 16 shows an example in which the wireless communication interface 1025 includes multiple BB processors 1026 and multiple RF circuits 1027, the wireless communication interface 1025 may also include a single BB processor 1026 or a single RF circuit 1027.

Figure 17:
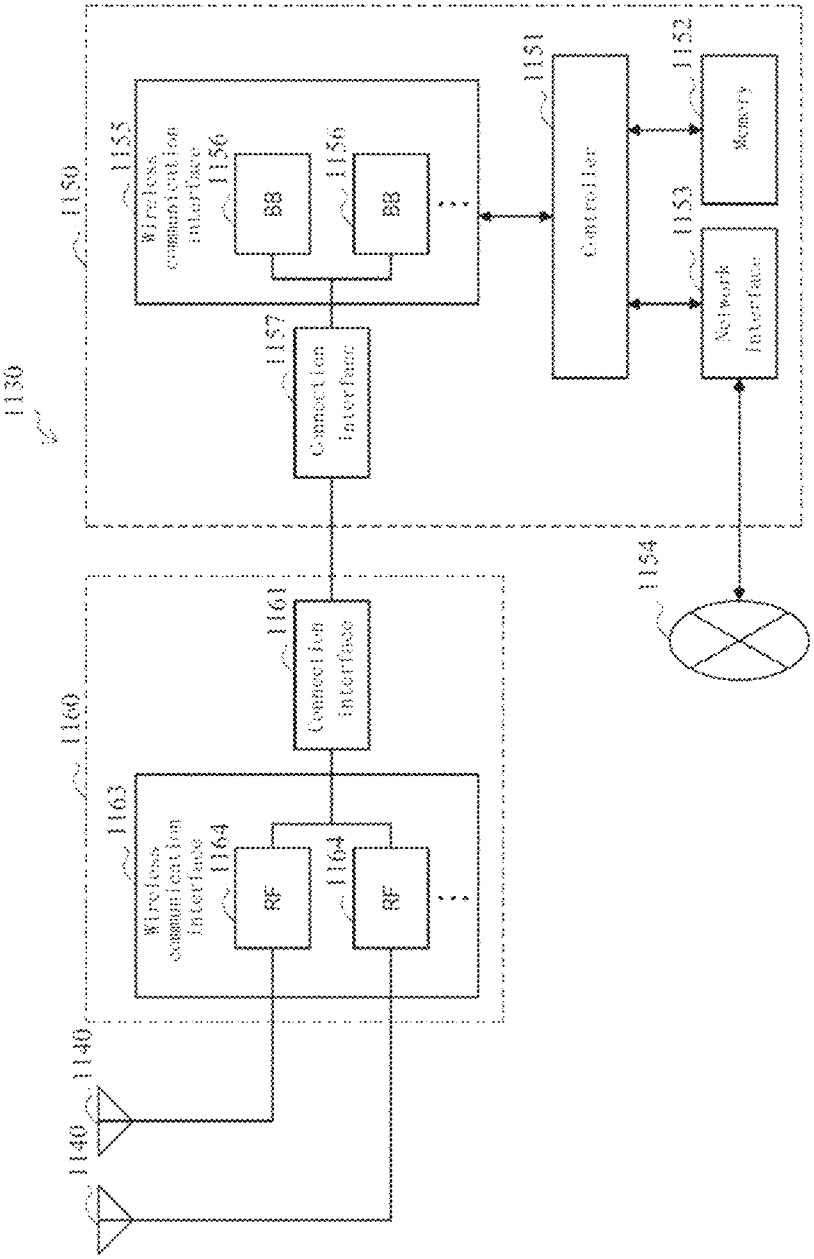
FIG. 17 is a block diagram showing a second example of the schematic configuration of an eNB or gNB applicable to the present disclosure.

FIG. 17 is a block diagram showing a second example of a schematic configuration of an eNB to which the technology of the present disclosure may be applied. The eNB 1130 includes one or more antennas 1140, a base station device 1150, and an RRH 1160. The RRH 1160 and each antenna 1140 can be connected to each other via an RF cable. The base station apparatus 1150 and the RRH 1160 can be connected to each other via a high-speed line such as an optical fiber cable.

Each of the antennas 1140 includes a single or multiple antenna elements (such as multiple antenna elements included in a MIMO antenna) and is used for the RRH 1160 to transmit and receive wireless signals. As shown in FIG. 17, the eNB 1130 may include multiple antennas 1140. For example, the multiple antennas 1140 may be compatible with multiple frequency bands used by the eNB 1130. Although FIG. 17 shows an example in which the eNB 1130 includes multiple antennas 1140, the eNB 1130 may also include a single antenna 1140.

The base station device 1150 includes a controller 1151, a memory 1152, a network interface 1153, a wireless communication interface 1155, and a connection interface 1157. The controller 1151, the memory 1152, and the network interface 1153 are the same as the controller 1021, the memory 1022, and the network interface 1023 described with reference to FIG. 16, respectively.

The wireless communication interface 1155 supports any cellular communication scheme, such as LTE and LTE-Advanced, and provides wireless communication to a terminal located in a sector corresponding to the RRH 1160 via the RRH 1160 and the antenna 1140. The wireless communication interface 1155 may generally include, for example, a BB processor 1156. The BB processor 1156 is the same as the BB processor 1026 described with reference to FIG. 16 except that the BB processor 1156 is connected to the RF circuit 1164 of the RRH 1160 via the connection interface 1157. As shown in FIG. 17, the wireless communication interface 1155 may include multiple BB processors 1156. For example, the multiple BB processors 1156 may be compatible with multiple frequency bands used by the eNB 1130. Although FIG. 17 shows an example in which the wireless communication interface 1155 includes multiple BB processors 1156, the wireless communication interface 1155 may also include a single BB processor 1156.

The connection interface 1157 is an interface for connecting the base station device 1150 (wireless communication interface 1155) to the RRH 1160. The connection interface 1157 may also be a communication module for connecting the base station device 1150 (wireless communication interface 1155) to the communication in the above-mentioned high-speed line of the RRH 1160.

The RRH 1160 includes a connection interface 1161 and a wireless communication interface 1163.

The connection interface 1161 is an interface for connecting the RRH 1160 (wireless communication interface 1163) to the base station device 1150. The connection interface 1161 may also be a communication module for communication in the above-mentioned high-speed line.

The wireless communication interface 1163 transmits and receives wireless signals via the antenna 1140. The wireless communication interface 1163 may generally include, for example, an RF circuit 1164. The RF circuit 1164 may include, for example, a mixer, a filter, and an amplifier, and transmit and receive wireless signals via the antenna 1140. As shown in FIG. 17, the wireless communication interface 1163 may include multiple RF circuits 1164. For example, the multiple RF circuits 1164 may support multiple antenna elements. Although FIG. 17 shows an example in which the wireless communication interface 1163 includes multiple RF circuits 1164, the wireless communication interface 1163 may also include a single RF circuit 1164.

In the eNB 1000 shown in FIG. 16 and the eNB 1130 shown in FIG. 17, the processing circuit 1410 described in FIG. 14 may be implemented by the controller 1021 and/or the controller 1151. The communication unit 1420 described in FIG. 14 may be implemented by the wireless communication interface 1025 and the wireless communication interface 1155 and/or the wireless communication interface 1163. At least a part of the functions may also be implemented by the controller 1021 and the controller 1151. For example, the controller 1021 and/or the controller 1151 may perform a control function by executing instructions stored in a corresponding memory.

Figure 18:
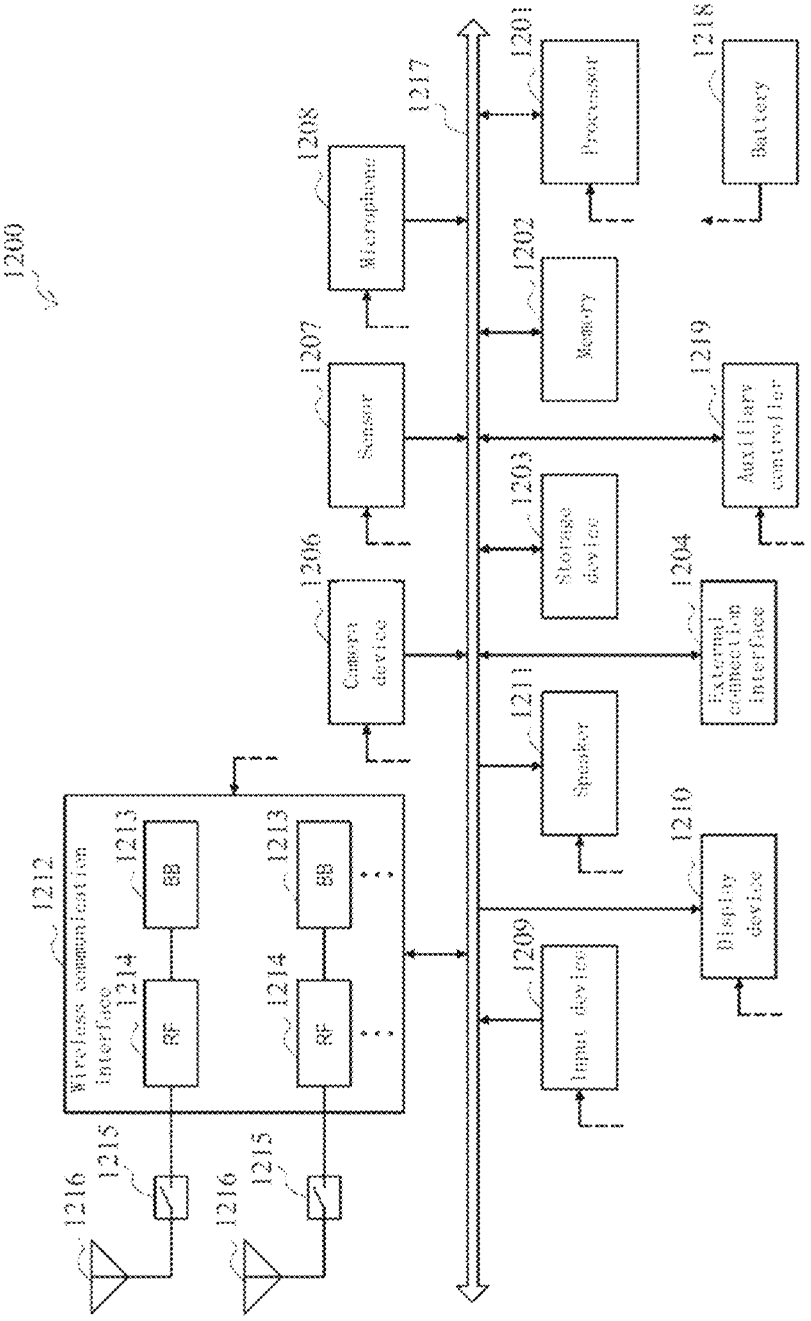
FIG. 18 is a block diagram showing an example of a schematic configuration of a smartphone applicable to the present disclosure.

FIG. 18 is a block diagram showing an example of a schematic configuration of a smartphone 1200 to which the technology of the present disclosure may be applied. The smartphone 1200 includes a processor 1201, a memory 1202, a storage device 1203, an external connection interface 1204, a camera device 1206, a sensor 1207, a microphone 1208, an input device 1209, a display device 1210, a speaker 1211, a wireless communication interface 1212, one or more antenna switches 1215, one or more antennas 1216, a bus 1217, a battery 1218, and an auxiliary controller 1219.

The processor 1201 may be, for example, a CPU or a system on a chip (SoC), and controls the functions of the application layer and other layers of the smartphone 1200. The memory 1202 includes a RAM and a ROM, and stores data and programs executed by the processor 1201. The storage device 1203 may include a storage medium such as a semiconductor memory and a hard disk. The external connection interface 1204 is an interface for connecting an external device such as a memory card and a universal serial bus (USB) device to the smartphone 1200.

The camera device 1206 includes an image sensor (such as a charge coupled device (CCD) and a complementary metal oxide semiconductor (CMOS)), and generates a captured image. The sensor 1207 may include a group of sensors, such as a measurement sensor, a gyroscope sensor, a geomagnetic sensor, and an acceleration sensor. The microphone 1208 converts the sound inputted to the smart phone 1200 into an audio signal. The input device 1209 includes, for example, a touch sensor, a keypad, a keyboard, a button, or a switch configured to detect a touch on the screen of the display device 1210, and receive an operation or information input from a user. The display device 1210 includes a screen such as a liquid crystal display (LCD) and an organic light emitting diode (OLED) display, and displays an output image of the smartphone 1200. The speaker 1211 converts an audio signal outputted from the smartphone 1200 into sound.

The wireless communication interface 1212 supports any cellular communication scheme (such as LTE and LTE-Advanced), and performs wireless communication. The wireless communication interface 1212 may generally include, for example, a BB processor 1213 and an RF circuit 1214. The BB processor 1213 may perform, for example, encoding/decoding, modulation/demodulation, and multiplexing/demultiplexing, and perform various types of signal processing for wireless communication. Further, the RF circuit 1214 may include, for example, a mixer, a filter, and an amplifier, and transmit and receive wireless signals via the antenna 1216. The wireless communication interface 1212 may be a chip module on which a BB processor 1213 and an RF circuit 1214 are integrated. As shown in FIG. 18, the wireless communication interface 1212 may include multiple BB processors 1213 and multiple RF circuits 1214. Although FIG. 18 shows an example in which the wireless communication interface 1212 includes multiple BB processors 1213 and multiple RF circuits 1214, the wireless communication interface 1212 may also include a single BB processor 1213 or a single RF circuit 1214.

In addition to the cellular communication scheme, the wireless communication interface 1212 may support another type of wireless communication scheme, such as a short-range wireless communication scheme, a near field communication scheme, and a wireless local area network (LAN) scheme. In this case, the wireless communication interface 1212 may include a BB processor 1213 and an RF circuit 1214 for each wireless communication scheme.

Each of the antenna switches 1215 switches the connection destination of the antenna 1216 among multiple circuits included in the wireless communication interface 1212 (for example, circuits for different wireless communication schemes).

Each of the antennas 1216 includes a single or multiple antenna elements (such as multiple antenna elements included in a MIMO antenna), and is used for the wireless communication interface 1212 to transmit and receive wireless signals. As shown in FIG. 18, the smartphone 1200 may include multiple antennas 1216. Although FIG. 18 shows an example in which the smartphone 1200 includes multiple antennas 1216, the smartphone 1200 may also include a single antenna 1216.

In addition, the smartphone 1200 may include an antenna 1216 for each wireless communication scheme. In this case, the antenna switch 1215 may be omitted from the configuration of the smart phone 1200.

The processor 1201, the memory 1202, the storage device 1203, the external connection interface 1204, the camera device 1206, the sensor 1207, the microphone 1208, the input device 1209, the display device 1210, the speaker 1211, the wireless communication interface 1212, and the auxiliary controller 1219 are connected to each other via the bus 1217. The battery 1218 supplies power to each block of the smartphone 1200 shown in FIG. 18 via a feeder line, and the feeder line is partially shown as a dashed line in the drawings. The auxiliary controller 1219 operates the minimum necessary functions of the smartphone 1200 in the sleep mode, for example.

In the smartphone 1200 shown in FIG. 18, the processing circuit 310 described in FIG. 3 and the determining unit 311 and the setting unit 312 therein may be implemented by the processor 1201 or the auxiliary controller 1219. The communication unit 320 described in FIG. 3 may be implemented by the wireless communication interface 1212. At least part of the function may also be implemented by the processor 1201 or the auxiliary controller 1219. For example, the processor 1201 or the auxiliary controller 1219 may perform determination function and setting function by executing instructions stored in the memory 1202 or the storage device 1203.

Figure 19:
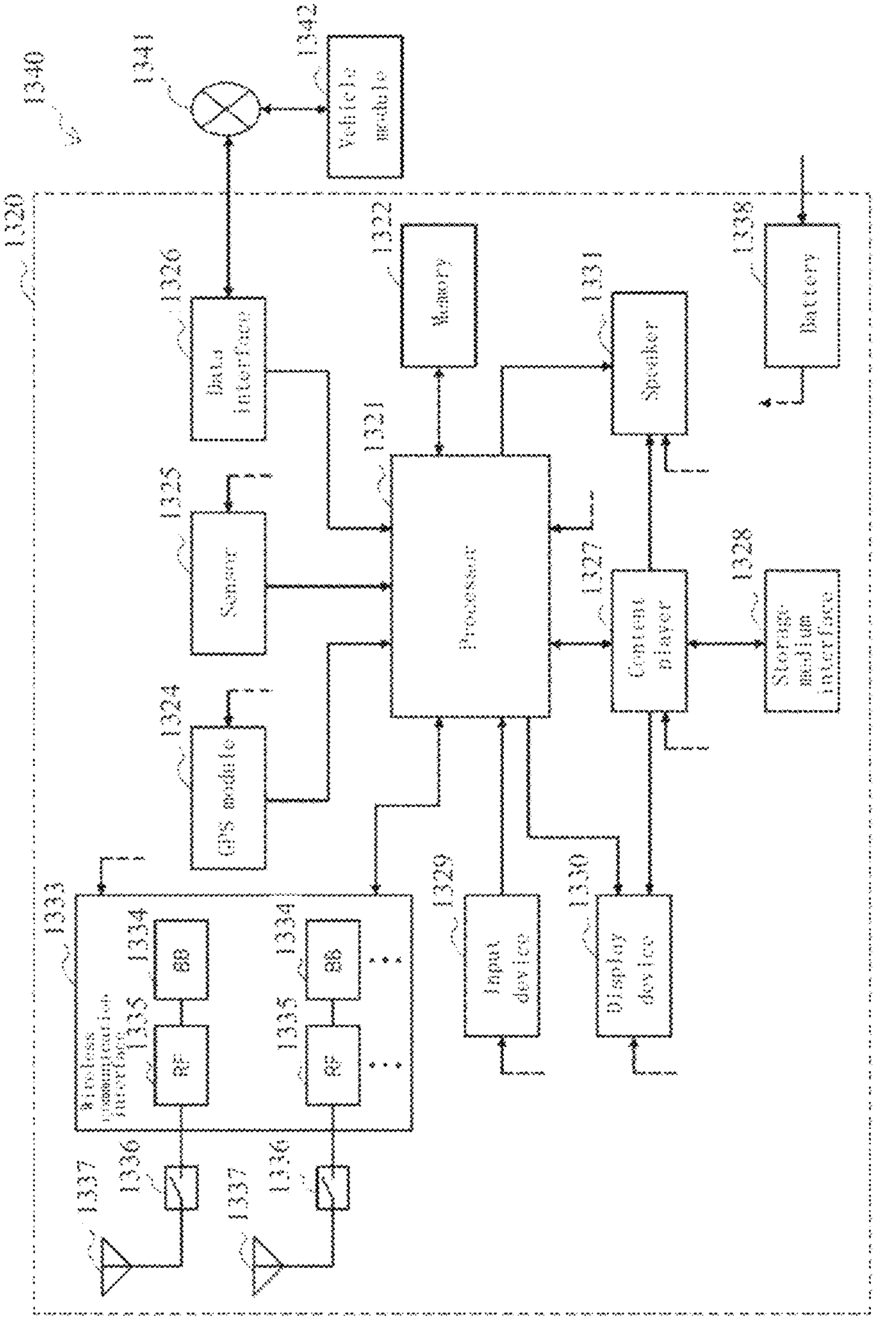
FIG. 19 is a block diagram showing an example of a schematic configuration of a vehicle navigation device applicable to the present disclosure.

FIG. 19 is a block diagram showing an example of a schematic configuration of a vehicle navigation device 1320 to which the technology of the present disclosure may be applied. The vehicle navigation device 1320 includes a processor 1321, a memory 1322, a global positioning system (GPS) module 1324, a sensor 1325, a data interface 1326, a content player 1327, a storage medium interface 1328, an input device 1329, a display device 1330, a speaker 1331, a wireless communication interface 1333, one or more antenna switches 1336, one or more antennas 1337, and a battery 1338.

The processor 1321 may be, for example, a CPU or SoC, and controls the navigation function of the car navigation device 1320 and other functions. The memory 1322 includes a RAM and a ROM, and stores data and programs executed by the processor 1321.

The GPS module 1324 measures a position (such as latitude, longitude, and altitude) of the vehicle navigation device 1320 based on GPS signals received from GPS satellites. The sensor 1325 may include a group of sensors, such as a gyroscope sensor, a geomagnetic sensor, and an air pressure sensor. The data interface 1326 is connected to, for example, a vehicle-mounted network 1341 via a terminal not shown, and acquires data (such as vehicle speed data) generated by the vehicle.

The content player 1327 reproduces content stored in a storage medium (such as CD and DVD), which is inserted into the storage medium interface 1328. The input device 1329 includes, for example, a touch sensor configured to detect a touch on the screen of the display device 1330, a button, or a switch, and receives an operation or information input from the user. The display device 1330 includes a screen such as an LCD or OLED display, and displays an image of a navigation function or reproduced content. The speaker 1331 outputs the sound of the navigation function or the reproduced content.

The wireless communication interface 1333 supports any cellular communication scheme such as LTE and LTE-Advanced, and performs wireless communication. The wireless communication interface 1333 may generally include, for example, a BB processor 1334 and an RF circuit 1335. The BB processor 1334 may perform, for example, encoding/decoding, modulation/demodulation, and multiplexing/demultiplexing, and perform various types of signal processing for wireless communication. Further, the RF circuit 1335 may include, for example, a mixer, a filter, and an amplifier, and transmit and receive wireless signals via the antenna 1337. The wireless communication interface 1333 may also be a chip module on which the BB processor 1334 and the RF circuit 1335 are integrated. As shown in FIG. 19, the wireless communication interface 1333 may include multiple BB processors 1334 and multiple RF circuits 1335. Although FIG. 19 shows an example in which the wireless communication interface 1333 includes multiple BB processors 1334 and multiple RF circuits 1335, the wireless communication interface 1333 may also include a single BB processor 1334 or a single RF circuit 1335.

In addition to the cellular communication scheme, the wireless communication interface 1333 may support another type of wireless communication scheme, such as a short-range wireless communication scheme, a near field communication scheme, and a wireless LAN scheme. In this case, the wireless communication interface 1333 may include a BB processor 1334 and an RF circuit 1335 for each wireless communication scheme.

Each of the antenna switches 1336 switches the connection destination of the antenna 1337 among multiple circuits included in the wireless communication interface 1333, such as circuits for different wireless communication schemes.

Each of the antennas 1337 includes a single or multiple antenna elements (such as multiple antenna elements included in a MIMO antenna), and is used for the wireless communication interface 1333 to transmit and receive wireless signals. As shown in FIG. 19, the vehicle navigation device 1320 may include multiple antennas 1337. Although FIG. 19 shows an example in which the vehicle navigation device 1320 includes multiple antennas 1337, the vehicle navigation device 1320 may also include a single antenna 1337.

In addition, the vehicle navigation device 1320 may include an antenna 1337 for each wireless communication scheme. In this case, the antenna switch 1336 may be omitted from the configuration of the car navigation device 1320.

The battery 1338 supplies power to each block of the vehicle navigation device 1320 shown in FIG. 19 via a feeder line, and the feeder line is partially shown as a dashed line in the drawings. The battery 1338 accumulates electric power supplied from the vehicle.

In the vehicle navigation device 1320 shown in FIG. 19, the processing circuit 310 described in FIG. 3 and the determining unit 311 and the setting unit 312 therein may be implemented by the processor 1321. The communication unit 320 described in FIG. 3 may be implemented by a wireless communication interface 1333. At least part of the functions may also be implemented by the processor 1321. For example, the processor 1321 may perform determination function and setting function by executing instructions stored in the memory 1322.

The technology of the present disclosure may also be implemented as a vehicle-mounted system (or vehicle) 1340 including one or more blocks in a vehicle navigation device 1320, a vehicle-mounted network 1341, and a vehicle module 1342. The vehicle module 1342 generates vehicle data (such as vehicle speed, engine speed, and failure information), and outputs the generated data to the vehicle-mounted network 1341.

In the system and method of the present disclosure, it is apparent that components or steps may be decomposed and/or recombined. These decomposition and/or recombination should be regarded as equivalent solutions of the present disclosure. The steps of performing the above-mentioned series of processing may naturally be performed in chronological order in the order of description, but are unnecessarily performed in the chronological order. Some steps may be performed in parallel or independently of each other.

Although the embodiments of the present disclosure have been described in detail above with reference to the accompanying drawings, it should be understood that the above-described embodiments are only used to illustrate the present disclosure, rather than constitute a limitation to the present disclosure. For those skilled in the art, various modifications and changes may be made to the above-mentioned embodiments without departing from the essence and scope of the present disclosure. Therefore, the scope of the present disclosure is limited only by the appended claims and their equivalent meanings.

The invention claimed is:

1. A user equipment in a wireless communication system which communicates with an electronic device in the wireless communication system via a primary cell and a plurality of secondary cells, the user equipment comprising:

one or more processing circuits configured to perform operations comprising:

determining, for each of the plurality of secondary cells, whether a secondary cell beam failure has happened; and setting a single media access control-control element MAC CE to notify the electronic device upon determining that the secondary cell beam failure has happened in at least two of the plurality of secondary cells, wherein the MAC CE comprises at least index information of respective component carriers in which the secondary cell beam failure has happened, wherein in determining, for each of the plurality of secondary cells, whether the secondary cell beam failure has happened, the one or more processing circuits is further configured to perform operations comprising:

determining, based on a reference signal set q0 for the secondary cell beam failure detection, a secondary cell partial beam failure state in which only a part of reference signals in the q0 are in a beam failure channel condition;

reporting, to the electronic device, information indicating that the part of reference signals are in the beam failure channel condition; and resetting the q0 based on a message from the electronic device.

2. The user equipment according to claim 1, wherein the processing circuit is further configured to perform the following operations:

for each secondary cell in which the secondary cell beam failure has happened, selecting a new beam based on a candidate reference signal set q1 for secondary cell beam failure recovery, and wherein the MAC CE further comprises identification information of the selected new beam, the identification information corresponding to the index information.

3. The user equipment according to claim 2, wherein when at least two pieces of identification information are the same, the processing circuit is further configured to perform the following operations:

dividing a plurality pieces of index information corresponding to the same identification information into a group; and setting the MAC CE such that the plurality pieces of index information in the group correspond to a single piece of identification information.

4. The user equipment according to claim 3, wherein the processing circuit is further configured to perform the following operations:

setting the MAC CE such that the MAC CE comprises information indicating a length of the group.

5. The user equipment according to claim 3, wherein the processing circuit is further configured to perform the following operations:

searching for a physical downlink control channel PDCCH signal in a recovery search space of any one of the plurality of secondary cells corresponding to the plurality pieces of index information in the group; and stopping busy detection of the recovery search space of each of the plurality of secondary cells corresponding to the plurality pieces of index information in the group when the PDCCH signal is detected.

6. The user equipment according to claim 2, wherein the processing circuit is further configured to perform the following operations:

when the new beam cannot be selected based on the q1, reporting, to the electronic device, information indicating that there is no new beam; and reselecting a new beam by an asynchronous downlink beam scanning process triggered by the electronic device.

7. The user equipment according to claim 1, wherein the processing circuit is further configured to perform the following operations:

searching for a physical downlink control channel PDCCH signal in a recovery search space of the primary cell.

8. The user equipment according to claim 7, wherein the processing circuit is further configured to perform the following operations:

acquiring, from a physical downlink shared channel PDSCH signal scheduled by the PDCCH signal, identification information of a new beam reselected by the electronic device for a respective component carrier in which the secondary cell beam failure has happened.

9. The user equipment according to claim 1, wherein the processing circuit is further configured to perform the following operations:

preselecting, for each of the plurality of secondary cells, a new beam based on a candidate reference signal set q1 for secondary cell beam failure recovery;

when the new beam cannot be selected based on the q1, reporting, to the electronic device, information indicating that there is no new beam; and reselecting a new beam by an asynchronous downlink beam scanning process triggered by the electronic device.

10. The user equipment according to claim 1, wherein the electronic device is a base station or a transmit/receive port TRP.

11. A method for wireless communication in a wireless communication system, the wireless communication system comprising user equipment and an electronic device, the user equipment communicating with the electronic device via a primary cell and a plurality of secondary cells, the method comprising:

determining, for each of the plurality of secondary cells, whether a secondary cell beam failure has happened; and setting a single media access control-control element MAC CE to notify the electronic device upon determining that the secondary cell beam failure has happened in at least two of the plurality of secondary cells, wherein the MAC CE comprises at least index information of respective component carriers in which the secondary cell beam failure has happened, wherein in determining, for each of the plurality of secondary cells, whether the secondary cell beam failure has happened, the method further comprises:

determining, based on a reference signal set q0 for the secondary cell beam failure detection, a secondary cell partial beam failure state in which only a part of reference signals in the q0 are in a beam failure channel condition;

reporting, to the electronic device, information indicating that the part of reference signals are in the beam failure channel condition; and resetting the q0 based on a message from the electronic device.

12. The method according to claim 11, further comprising:

for each secondary cell in which the secondary cell beam failure has happened, selecting a new beam based on a candidate reference signal set q1 for secondary cell beam failure recovery, and wherein the MAC CE further comprises identification information of the selected new beam, the identification information corresponding to the index information.

13. The method of claim 12, wherein when at least two pieces of the identification information are the same, the method further comprises:

dividing a plurality pieces of index information corresponding to the same identification information into a group; and setting the MAC CE such that the plurality pieces of index information in the group correspond to a single piece of identification information.

14. The method according to claim 13, further comprising:

setting the MAC CE such that the MAC CE comprises information indicating a length of the group.

15. The method according to claim 13, further comprising:

searching for a physical downlink control channel PDCCH signal in a recovery search space of any one of the plurality of secondary cells corresponding to the plurality pieces of index information in the group; and stopping busy detection of the recovery search space of each of the plurality of secondary cells corresponding to the plurality pieces of index information in the group when the PDCCH signal is detected.

16. The method according to claim 11, further comprising:

searching for a physical downlink control channel PDCCH signal in a recovery search space of the primary cell.

17. A non-transitory computer readable medium storing a product containing instructions which when executed by a processor performs a method for wireless communication in a wireless communication system, the wireless communication system comprising user equipment and an electronic device, the user equipment communicating with the electronic device via a primary cell and a plurality of secondary cells, the method comprising:

determining, for each of the plurality of secondary cells, whether a secondary cell beam failure has happened; and setting a single media access control-control element MAC CE to notify the electronic device upon determining that the secondary cell beam failure has happened in at least two of the plurality of secondary cells, wherein the MAC CE comprises at least index information of respective component carriers in which the secondary cell beam failure has happened, wherein in determining, for each of the plurality of secondary cells, whether the secondary cell beam failure has happened, the method further comprises:

determining, based on a reference signal set q0 for the secondary cell beam failure detection, a secondary cell partial beam failure state in which only a part of reference signals in the q0 are in a beam failure channel condition;

reporting, to the electronic device, information indicating that the part of reference signals are in the beam failure channel condition; and resetting the q0 based on a message from the electronic device.

* * * * *